United States Patent
Kojo

(10) Patent No.: US 9,017,166 B2
(45) Date of Patent: Apr. 28, 2015

(54) MATCHING NETWORK GAME PLAYERS BY GIVING THE PERCEPTION OF BEING THE FIRST TO REQUEST PARTICIPATION

(71) Applicant: DeNA Co., Ltd., Tokyo (JP)

(72) Inventor: Taku Kojo, Tokyo (JP)

(73) Assignee: DeNA, Co., Ltd., Tokyo (JP)

( * ) Notice: Subject to any disclaimer, the term of this patent is extended or adjusted under 35 U.S.C. 154(b) by 0 days.

(21) Appl. No.: 14/185,795

(22) Filed: Feb. 20, 2014

(65) Prior Publication Data
US 2014/0243085 A1    Aug. 28, 2014

(30) Foreign Application Priority Data
Feb. 27, 2013  (JP) .................................. 2013-037794

(51) Int. Cl.
*A63F 9/24* (2006.01)
*A63F 13/30* (2014.01)

(52) U.S. Cl.
CPC ...................................... *A63F 13/12* (2013.01)

(58) Field of Classification Search
CPC ............. A63F 13/12; A63F 2300/5566; A63F 2300/556; A63F 2300/558; A63F 2300/5546; A63F 2300/572; A63F 13/10; A63F 2300/406; A63F 2300/407; A63F 2300/5533; A63F 2300/5593; A63F 2300/5553; A63F 2300/636; G06Q 50/01; G07F 17/03
USPC ...................................................... 463/29, 42
See application file for complete search history.

(56) References Cited

U.S. PATENT DOCUMENTS

| | | | | |
|---|---|---|---|---|
| 6,641,481 | B1 * | 11/2003 | Mai et al. ......................... | 463/42 |
| 2006/0121990 | A1 * | 6/2006 | O'Kelley et al. ................. | 463/42 |
| 2010/0306672 | A1 * | 12/2010 | McEniry ........................ | 715/753 |
| 2012/0302332 | A1 * | 11/2012 | Buhr ............................... | 463/29 |
| 2012/0309538 | A1 * | 12/2012 | Murphy et al. .................. | 463/42 |

FOREIGN PATENT DOCUMENTS

| | | |
|---|---|---|
| JP | 2009-189594 B | 8/2009 |
| JP | 4765384 A | 6/2011 |
| JP | 4929373 A | 2/2012 |
| JP | 2012-055435 B | 3/2012 |

OTHER PUBLICATIONS

Japanese Patent Application No. 2013-037794: Office Action mailed on Dec. 5, 2013.
Japanese Patent Application No. 2013-037794: Decision to Grant mailed on Feb. 12, 2014.

* cited by examiner

*Primary Examiner* — Steve Rowland
(74) *Attorney, Agent, or Firm* — Procopio, Cory, Hargreaves & Savitch LLP

(57) ABSTRACT

A server device receives a request for participation in a network game through a communication line, integrates user information of each user terminal from which the server receives the participation request, generates matching information of each user participating in the same network game to be started at the same time, and notifies the generated matching information to each terminal device. The matching information is different for each terminal device of notification destination so as to be displayed as if the terminal device of the notification destination made the earliest participation request, regardless of order of the participation request.

5 Claims, 15 Drawing Sheets

FIG. 3

USER MANAGEMENT DATA

| USER NAME | USER IDENTIFICATION INFORMATION | LEVEL | PROGRESS INFORMATION | POSSESSED CARD IDENTIFICATION INFORMATION | ⋮ |
|---|---|---|---|---|---|
| P1 | P001 | 10 | STAGE 2 | C001, C003 | ⋮ |
| P2 | P002 | 14 | STAGE 3 | C001, C003, C006 | ⋮ |
| P3 | P003 | 20 | STAGE 5 | C001, C005, C007, C009 | ⋮ |
| P4 | P004 | 3 | STAGE 1 | C002 | ⋮ |
| ⋮ | ⋮ | ⋮ | ⋮ | ⋮ | ⋮ |

FIG. 4

CARD MANAGEMENT DATA

| CARD IDENTIFICATION INFORMATION | NAME | RARITY VALUE | INITIAL ATTACK VALUE | INITIAL HIT POINT (HP) VALUE | ATTRIBUTE(S) VALUE | |
|---|---|---|---|---|---|---|
| C001 | KNIGHT A | UNCOMMON | 15 | 40 | LIGHT | ... |
| C002 | KNIGHT B | COMMON | 10 | 35 | WATER | ... |
| C003 | KNIGHT C | UNCOMMON | 20 | 35 | FIRE | ... |
| C004 | SAMURAI A | RARE | 120 | 70 | SOIL | ... |
| C005 | SAMURAI B | UNCOMMON | 70 | 50 | SOIL | ... |
| C006 | NINJA A | RARE | 100 | 50 | DARKNESS | ... |
| C007 | NINJA B | UNCOMMON | 35 | 20 | WATER | ... |
| C008 | MAGE A | UNCOMMON | 30 | 20 | FIRE | ... |
| C009 | MAGE B | COMMON | 20 | 10 | WATER | ... |
| C0010 | MONK | SUPER RARE | 150 | 200 | SOIL | ... |
| ... | ... | ... | ... | ... | ... | ... |
| ... | ... | ... | ... | ... | ... | ... |
| ... | ... | ... | ... | ... | ... | ... |

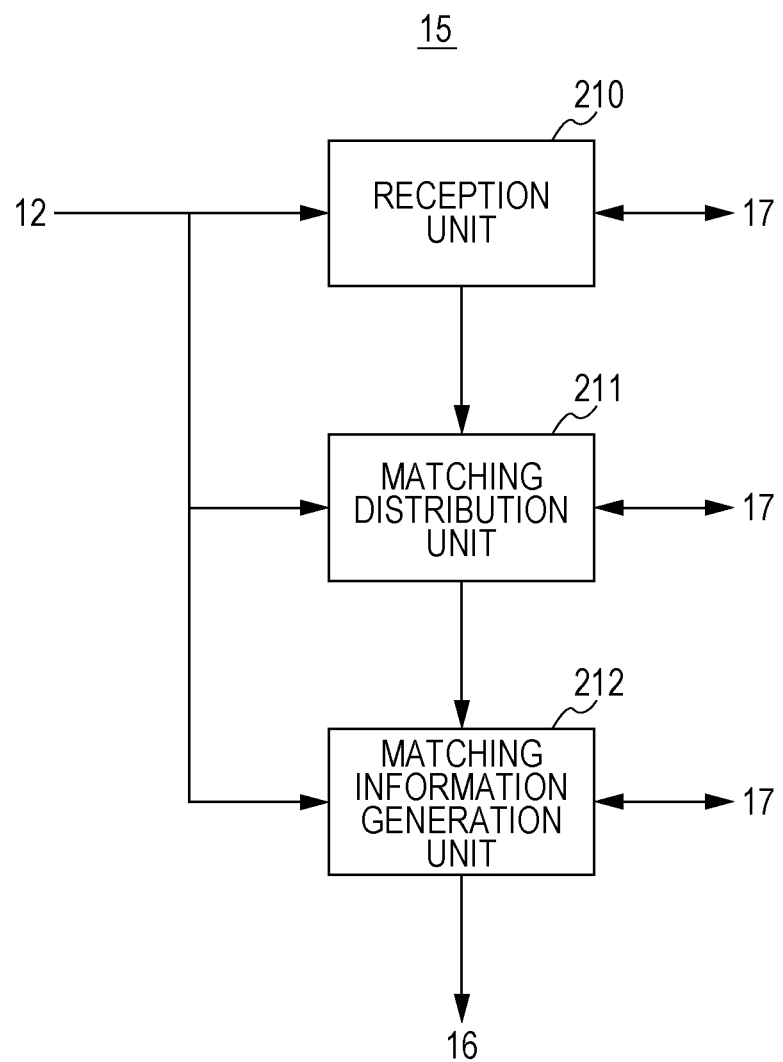

MATCHING NETWORK GAME PLAYERS BY GIVING THE PERCEPTION OF BEING THE FIRST TO REQUEST PARTICIPATION

BACKGROUND OF THE INVENTION

1. Field of the Invention

The present invention relates to a technology for processing a social game in which a plurality of users participates via a network.

2. Description of Related Art

Recently, a social game in which a plurality of users participates via a network by using a Social Networking Service (SNS) has spread widely, and a network game is provided which uses an information processing device such as a personal computer (PC) terminal or a mobile terminal to exchange information and communicate mutually through communication with a game server.

Among such network games, a so-called network battle game performs a battle between users or performs a battle with enemy team or between virtual enemies by organizing teams with users.

For example, JP 2012-55435 A discloses a technology in which different teams play the same network battle game, one of matching rooms is allocated to a user requesting participation in the game, and information of the allocated user is sequentially displayed as a matching room screen.

SUMMARY OF THE INVENTION

However, when newly participating in a network game, if allocated to a matching room where other user has already entered, other user exists in a matching room image. A user participating later than other user forms impression that the user himself or herself is a guest participating later, and a consciousness to contribute to participating in the game with a positive attitude is hindered. Thus, there is a problem that a heated game is difficult. If network games difficult to be heated are increased, there is a concern that the prosperity of network game industry will be declined.

The present invention has been made in view of such problems and is directed to provide a terminal device, a system, and a non-transitory computer-readable storage medium storing game program, which can further enhance the enjoyment by performing matching processing such that each of users participating in the network game has a positive attitude.

An aspect of the present invention relates to a server device. The server device includes: a reception unit that receives a request for participation in a network game allowing one or more users to participate therein, from each of terminal devices used by a plurality of users, through a communication line; and a matching processing unit that integrates user information for each user terminal from which the reception unit receives the participation request to generates matching information of each user participating in the same network game to be started at the same time, and notifies the generated matching information to each user terminal from which the reception unit receives the participation request. The matching information to be notified by the matching processing unit is different for each terminal device of notification destination so as to be displayed as if the terminal device of the notification destination made the earliest participation request, regardless of order of the participation request.

According to such an aspect, the matching information to be notified is displayed as if the terminal device of the notification destination made the earliest participation request, regardless of order of the participation request. Thus, each user participating in the game can recognize that the user himself or herself first expressed the participation in the game. Therefore, it is easy to heat up the game by accelerating contribution to participating in the game with a positive attitude, and the enjoyment can be enhanced. Thus, the prosperity of network game industry will be raised Also, the matching processing unit may include: a matching information generation unit that generates first matching information including only user information to be notified for each user of the notification destination, and second matching information including at least user information other than the user of the notification destination; and a matching information transmission unit that notifies the first matching information generated by the matching information generation unit and notifies the second matching information thereafter. Also, the matching information generation unit may generate the first matching information and generate the second matching information thereafter.

According to such an aspect, the first matching information including only the user information of the user of the notification destination and the second matching information including at least the user information other than the user of the notification destination are sequentially generated and notified. On the display screen of the user terminal, the effect that the user himself or herself is the first participant is displayed, and other game participants are displayed thereafter. Therefore, the user participating in the game can feel as if the user first entered the matching room.

Also, the reception unit may receive a search request for progressing the network game. Also, the matching information generation unit may generate the second matching information in response to the reception of the search request in the reception unit.

According to such an aspect, the second matching information is generated in response to the reception of the search request from the user. The first matching information for the corresponding user is generated and notified earlier than the second matching information. Thus, the user can feel as if he or she first expressed the participation in the game. Also, the search button is displayed on the screen of the user terminal which is generated based on the matching information, the operation is performed in the terminal device, so that the mission game can be progressed during the waiting time until the matching is completed. Therefore, the interest in the game can be accelerated, while keeping the user from being bored.

When generating the second matching information, the matching information generation unit may generate the matching information such that the user information of other user having high affinity with the user of the user terminal of the notification destination is preferentially included.

According to such an aspect, when the information of other user is included in the matching information, the information of other users having high affinity is preferentially included. Therefore, the sense of excitation of the user can be enhanced, and the enjoyment of the network game can be improved Also, the user information may include one or more of user identification information, a user name, an avatar, and a comment input by the user. Also, the reception unit may receive comment information for each user terminal receiving the participation request. The matching information generation unit may include the comment information received by the reception unit as the matching information to be notified to each user terminal participating in the same network game to be started at the same time.

According to such an aspect, when generating the matching information based on the user information, the matching information includes any one of a user name, an avatar, and a comment input by the user, or a combination thereof. By generating the matching image based on the matching information including them, the sense of excitation of the user can be enhanced by the matching image having excellent visibility in graphics.

Also, the matching processing unit may include the participation order information, in which the user information of the terminal of the notification destination is ranked No. 1, in the matching information, and may include the user information in descending order of the participation order among terminals other than the notification destination with respect to No. 2 and later.

The matching information according to such an aspect includes participation order information, in which the user information of the terminal of the notification destination is ranked No. 1, and includes the user information in descending order of the participation order among terminals other than the notification destination with respect to No. 2 and later. Therefore, each user participating in the game can recognize that the user himself or herself first expressed the participation in the game Also, another aspect of the present invention is a method. The method includes: receiving a request for participation in a network game allowing one or more users to participate therein, from each of terminal devices used by a plurality of users; and integrating user information for each user, which receives the participation request by the reception unit, generating matching information of each user participating in the same network game to be started at the same time, and notifying the generated matching information to each terminal device receiving the participation request. The matching information is different for each terminal device of notification destination so as to be displayed as if the terminal device of the notification destination made the earliest participation request, regardless of order of the participation request.

Also, another aspect of the present invention is a program. The program includes: receiving a request for participation in a network game allowing one or more users to participate therein, from each of terminal devices used by a plurality of users; and integrating user information for each user, which receives the participation request by the reception unit, generating matching information of each user participating in the same network game to be started at the same time, and notifying the generated matching information to each terminal device receiving the participation request. The matching information is different for each terminal device of notification destination so as to be displayed as if the terminal device of the notification destination made the earliest participation request, regardless of order of the participation request.

Also, even though the above elements are combined in any form and the expression of the present invention changes to the device, the system, and the computer program, these are effective as the aspects of the present invention.

According to the present invention, interest of all of a plurality of users participating in the game can be enhanced by appropriately performing matching processing of the network game.

BRIEF DESCRIPTION OF THE DRAWINGS

FIG. 3 is a diagram illustrating an example of user management data managed in a user information management unit of FIG. 2;

FIG. 4 is a diagram illustrating an example of card management data managed in the user information management unit of FIG. 2;

FIG. 5 is a diagram illustrating an example of a configuration of a matching processing unit of FIG. 2;

DETAILED DESCRIPTION OF THE INVENTION

Before describing embodiments of the present invention, the overview of the present invention will be first described. The present invention relates to matching processing when determining a matching in a game that is started at the same time in a network game played via a network by a plurality of users.

In the conventional matching processing, in a case where an expression of participation in a game is later than another participating user, the participating user recognizes that, a consciousness to contribute to participating in the game with a positive attitude is hindered. Thus, there is a problem that a heated game is difficult.

The present invention has been made in an effort to solve the above problems and is directed to provide a heated network game environment in which interest of each participating user is increased by performing matching processing to a user who has first expressed participation.

Hereinafter, an example to which the present invention is applied to a network game, especially a social game, will be described.

Herein, a social game will be briefly described. The social game refers to application game software that operates based on a platform such as an Application Programming Interface (API) or the like that generally operates on a web browser by using SNS information. Hereinafter, it will be simply referred to as a browser game.

Also, the social game uses the SNS information, but an application program may be downloaded to each terminal device operated by a user and the application program is executed in each terminal device to transmit and receive various parameters between each terminal device and the server device. Hereinafter, it will be simply referred to as an application.

Also, the following processing, which is an example of the present invention, can be performed in the server device that provides a game as a browser game, and can be performed in a program that is executed as an application game on the terminal device side. Also, the example to be described below is for understanding of the present invention, and is not intended to limit the technical scope of the present invention.

Embodiment 1

Figure 1:
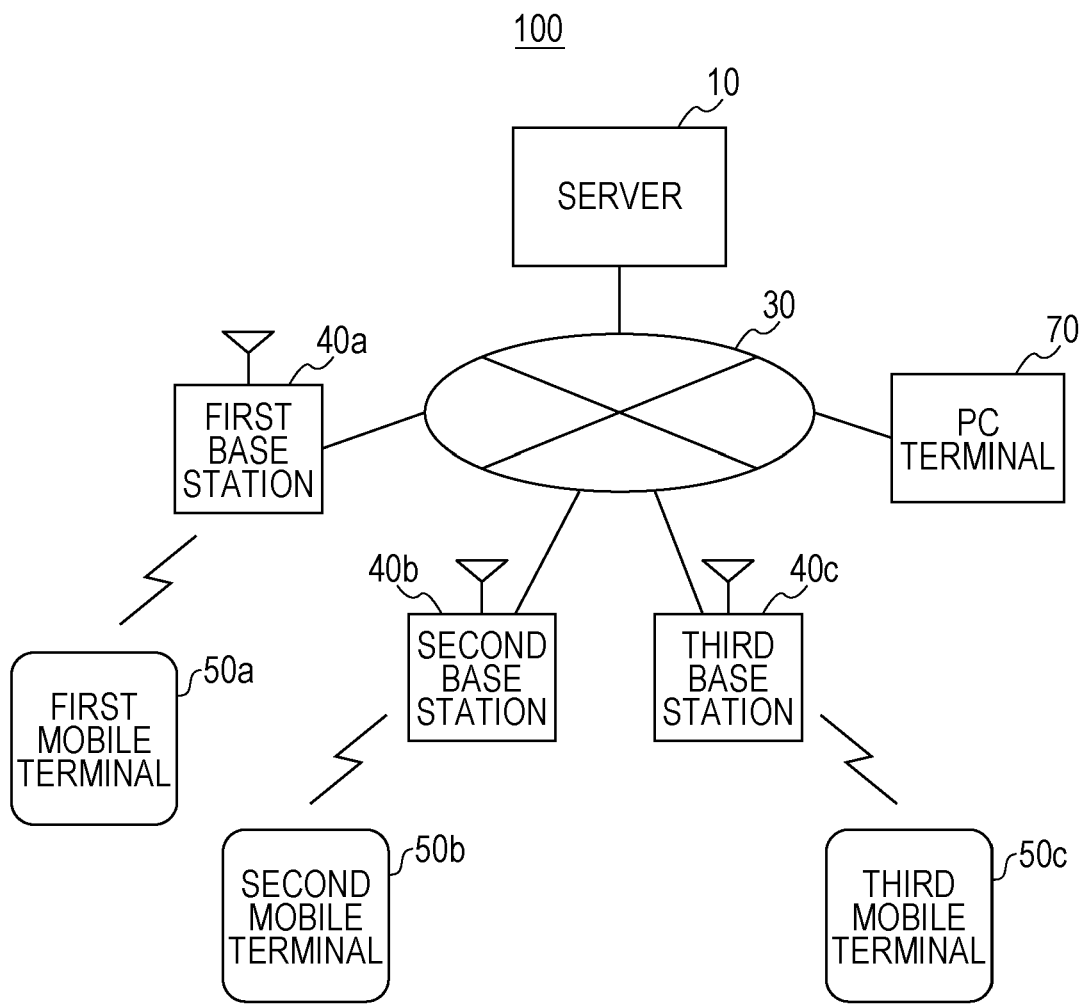
FIG. 1 is a diagram illustrating an example of a configuration of a social game system according to a first embodiment.

First, a first embodiment will be described. FIG. 1 is a diagram illustrating a social game system 100 according to a first embodiment. The social game system 100 includes a server device 10, a network 30 connecting the server device 10 and a base station 40 via a wired line, a first base station 40a to a third base station 40c represented by base stations 40, a first mobile terminal 50a to a third mobile terminal 50c represented by mobile terminals 50, and a PC terminal 70.

Also, for convenience of illustration, the base stations 40 and the mobile terminals 50 are illustrated as only three units, but are not limited thereto. More base stations 40 and more mobile terminals 50 may be present. The same is also true of the PC terminal 70. Also, the first mobile terminal 50a to the third mobile terminal 50c are illustrated as being connected to different base stations 40, respectively, but are not limited thereto. It is apparent that the present invention can be applied even when a plurality of mobile terminals 50 is connected to one base station 40.

The server device 10 is a device for executing and providing a social game service. The server device 10 performs communication processing for game processing with the mobile terminals 50 or the PC terminal 70 through the network 30 and the base station 40. Also, in the following, for simplicity of description, it will be just expressed as "performing communication processing between the server device 10 and the mobile terminals 50 or the PC terminal 70", and a description about the point "through the network 30 and the base station 40" will be omitted. Also, in the following, the mobile terminals 50 or the PC terminal 70 may be collectively expressed as user terminals. Also, the server device 10 may be a platform that provides such a service to the network game, or may be a server that provides an application of the network game.

Figure 2:
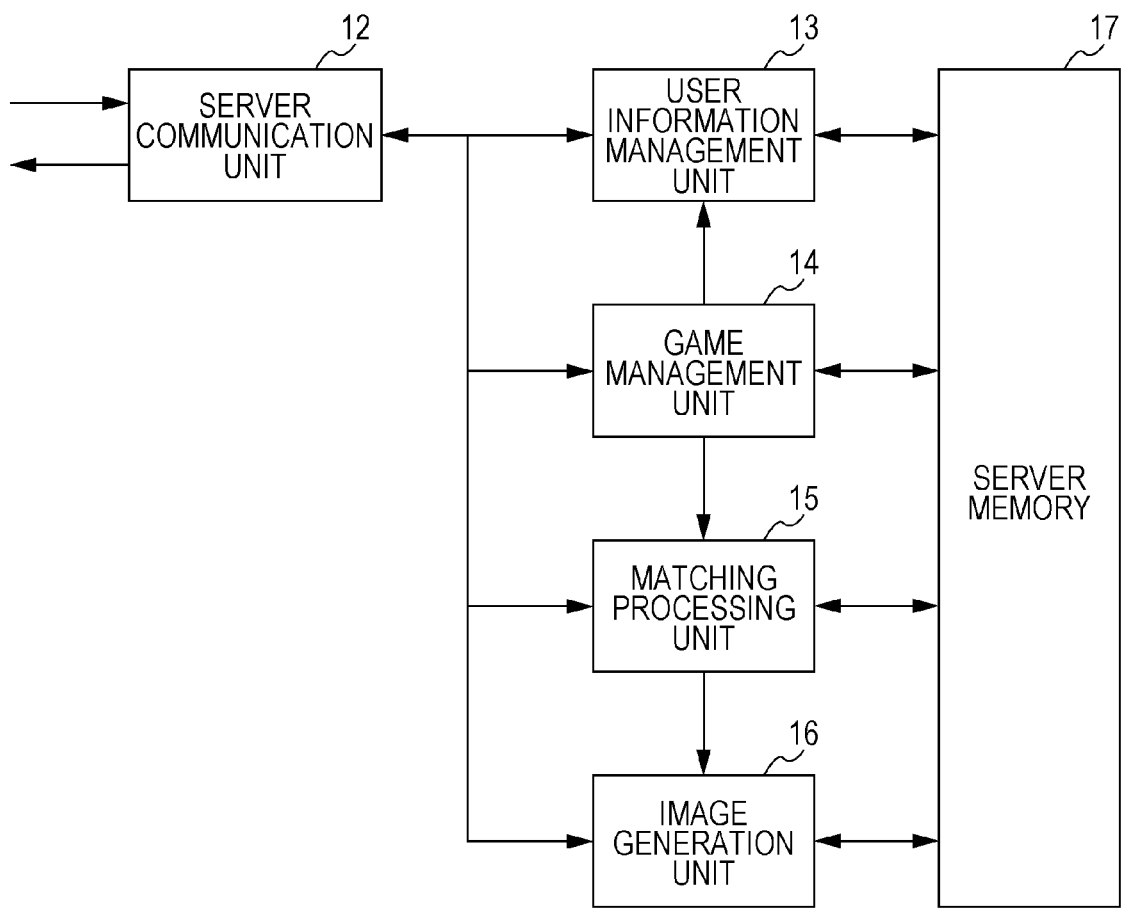
FIG. 2 is a diagram illustrating an example of a configuration of a server device of FIG. 1.

FIG. 2 is a diagram illustrating an example of a configuration of the server device 10 of FIG. 1. The server device 10 includes a server communication unit 12, a user information management unit 13, a game management unit 14, a matching processing unit 15, an image generation unit 16, and a server memory 17.

The server communication unit 12 communicates with an external SNS server device or user terminal through the network 30. Also, the server device 10 may also serve as the SNS server device, and the SNS server device is not illustrated.

The user information management unit 13 acquires user information registered in an SNS from the SNS server device and simultaneously manages information of the user registered in the social game in the server memory 17. Also, the user information management unit 13 uploads the user information, including the information acquired from the SNS server device, to the server memory 17. The server memory 17 stores card management data and the like used in the network game using card as well as the user information.

The user information is any one of user identification information, a user name, an avatar, a comment input by the user, or a combination thereof. Such user information is used when a matching room image is generated in the image generation unit 16 to be described below, and an image is generated which allows one image to visually recognize another user and can enhance the sense of realism.

FIG. 3 is a diagram illustrating an example of user management data managed in the server memory 17 of FIG. 2. As illustrated in FIG. 3, the user information management unit 13 may include tabular data in the server memory 17. Herein, the user name may use a user name on the SNS, or may be a name of a user set for each game.

Also, the user identification information is a unique code for identifying the user. Also, a level is a user level that sequentially increases based on the number of participations in the game or an obtained experience point. Also, a progress status is information indicating how far each user progresses the game. Also, possessed card identification information is identification information on a variety of cards such as a character card used in a team battle.

FIG. 4 is a diagram illustrating an example of user management data managed in the server memory 17 of FIG. 2. As illustrated in FIG. 4, the server memory 17 may include tabular data as the card management data. Herein, in FIG. 4, a name represents a name of a card itself or a name of a character displayed on the card. A rarity value represents a degree of a scarcity value of a corresponding card. For example, the rarity is divided into ranks such that rarity is raised stepwise just like monk, uncommon, rare, and super rare. An initial attack value is an initial attack value of a character in a team battle, and an initial hit point (HP) value is an initial value of a hit point (HP) of a character of a beam battle. Since these are initial values, the values are changed whenever the battle is repeated and the character is evolved and reinforced.

Returning to FIG. 2, the game management unit 14 performs a variety of processing and management such as the progress of the social game and the management of quest. The game management unit 14 controls the progress of the game, accesses the user information or the card management data stored in the server memory 17, and performs predetermined processing.

When a request for participation in a team battle of which the quest is selected from the user terminal is made, the matching processing unit 15 performs a team allocation of a user based on the selected quest and simultaneously generates matching information. The matching processing unit 15 generates matching information of each user participating in the same network game starting at the same time by integrating the user information of each user receiving the participation request through the server communication unit 12. Furthermore, the matching processing unit 15 notifies the generated matching information to each user terminal receiving the participation request through the server communication unit 12.

At this time, the matching information transmitted to each user terminal is different for each user terminal requesting participation. For example, when a plurality of user terminals requests participation in the same network game starting at the same time, the matching processing unit 15 generates different matching information for each terminal device, as if the user terminal of the notification destination made the earliest participation request, regardless of the order of the participation request. "As if . . . made the earliest participation request" includes displaying as the first participant regardless of the original order of participation. For example, the participation order information may be forcibly set to No. 1, and the arrangement order of the user information within the matching information may be set to be always at the forefront.

Also, by generating or notifying the matching information in two steps, a timing difference may be provided to the displaying of the information of the participating user on the user terminal. Such an aspect can allow each of the respective participating users themselves to be recognized as the first participating user, regardless of the respective participation timings. Details will be described below.

Also, the matching processing unit 15 may include the participation order information, in which the user information of the terminal of the notification destination is ranked No. 1, in the matching information, and may include the user information in descending order of the participation order among terminals other than the notification destination with respect to No. 2 and lower. The participation order information may indicate the display order in the terminal. Therefore, the same effect as that described above can be obtained by transmitting the matching information in which the participation order information is included, only one time, even without transmitting the matching information over a plurality of times.

Also, the matching information is constituted by the matched user information. The matching information may be the matching image itself. However, in the present embodiment, the separate image generation unit 16 may be used to generate a matching room image on the assumption that the matching image is the waiting room. The matching processing unit 15 outputs the matching information to the image generation unit 16.

The image generation unit 16 generates the matching room image as the matching image, based on the matching information output from the matching processing unit 15. The generated matching room image is transmitted to each user terminal through the server communication unit 12.

Herein, in each user terminal, the matching room image is displayed using the API of the web browser. When the matching processing unit 15 outputs the matching information to each user terminal through the server communication unit 12, the matching room image can be generated using the API on the terminal side. In this case, data communication is performed based on parameter information, without transmitting the matching room image itself on the network 30, and it is preferable in an environment with a narrow network band.

The server communication unit 12 receives a signal from each user terminal, performs predetermined demodulation processing, and transmits the demodulated signal to the user information management unit 13, the game management unit 14, the matching processing unit 15, and the image generation unit 16. Also, the server communication unit 12 performs predetermined modulation processing on signals transmitted from the user information management unit 13, the game management unit 14, the matching processing unit 15, and the image generation unit 16, and transmits the modulated signals to each user terminal. Also, as the modulation and demodulation processing by the server communication, the modulation and demodulation technique used in the past may be used, and it will be understood by those skilled in the art that the present invention can be applied to even such an aspect.

Next, the matching processing unit 15 will be described with reference to FIG. 5. FIG. 5 is a diagram illustrating an example of a configuration of the matching processing unit 15 of FIG. 2. The matching processing unit 15 includes a reception unit 210, a matching distribution unit 211, and a matching information generation unit 212.

The reception unit 210 receives a request for participation in a team battle related to a network game, in which one or more users can participate, from each of the user terminals used by the plurality of users through the communication line and the server communication unit 12. In the request, parameters such as to which quest the request for the participation in the team battle is, who is the user, from which terminal the request, is the are extracted and stored in the server memory 17, and the corresponding request is output to the matching distribution unit 211.

Also, the reception unit 210 receives comment information for each user terminal receiving the participation request, and receives a search request to search for enemies so as to progress the network game. Details will be described below.

Figure 6:
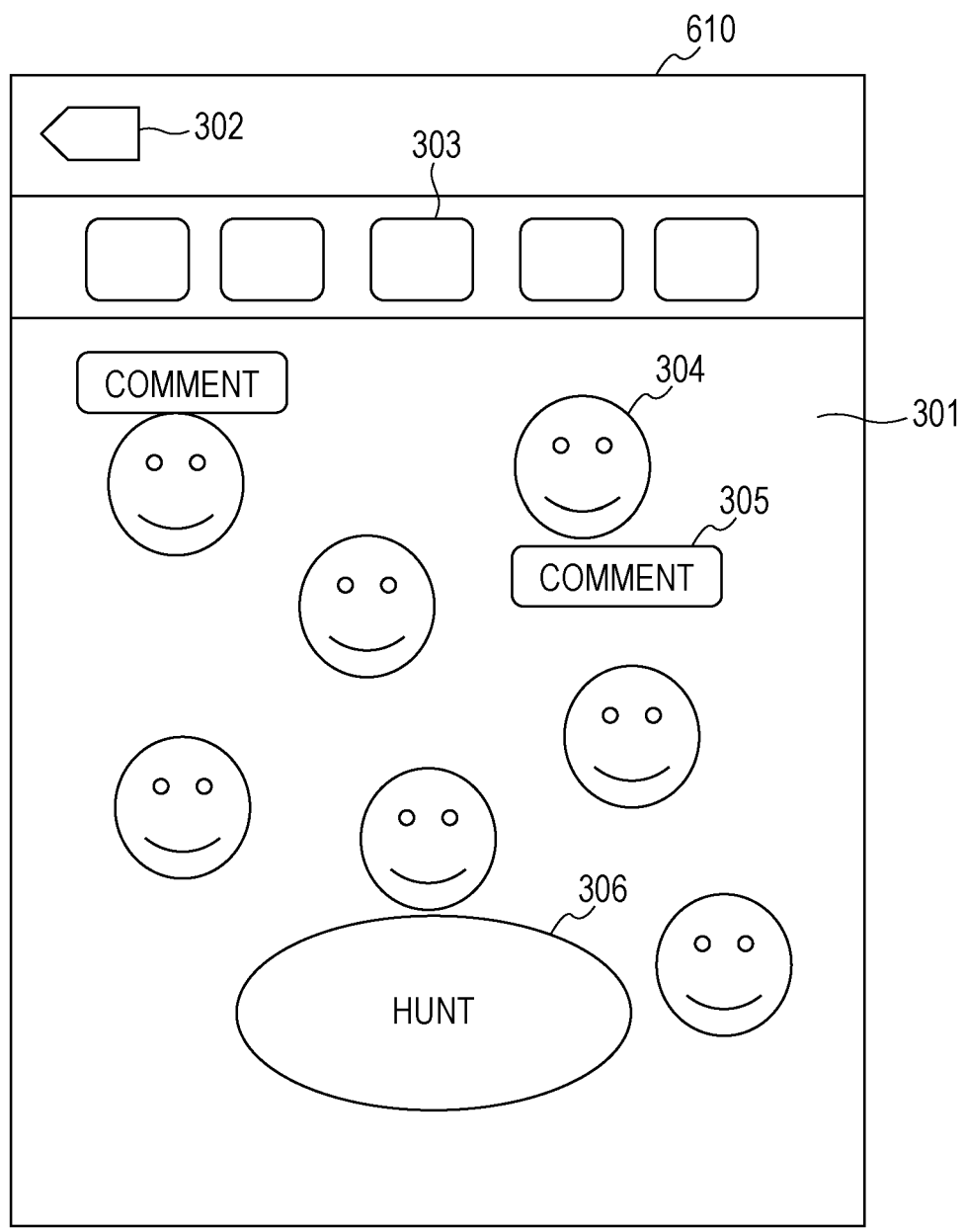
FIG. 6 is a diagram illustrating a first screen display example of a user terminal of FIG. 1.
Figure 7:
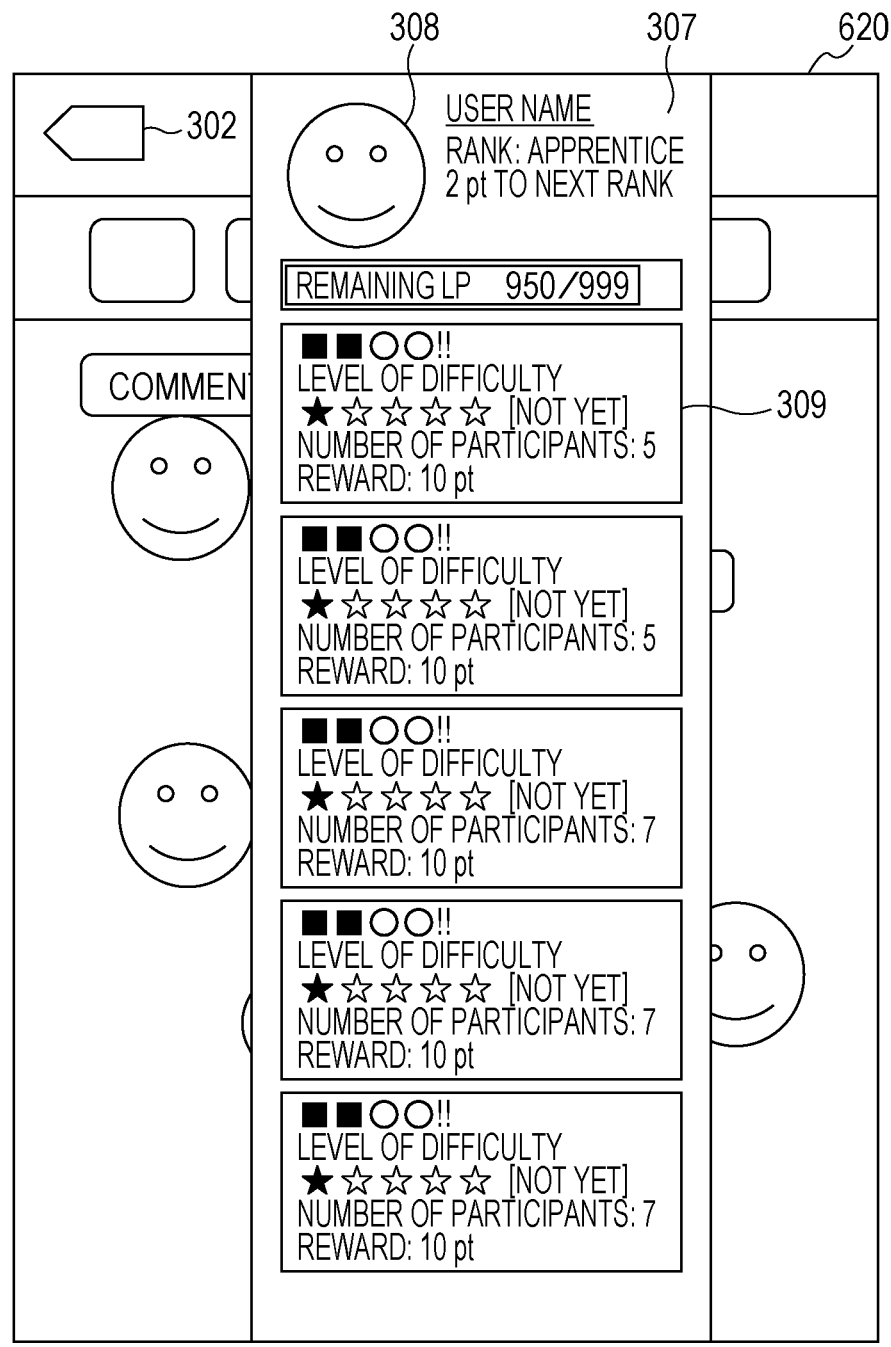
FIG. 7 is a diagram illustrating a second screen display example of the user terminal of FIG. 1.

Herein, a brief description will be given with reference to FIGS. 6 and 7. FIG. 6 is a diagram illustrating a first screen display example 610 of the user terminal of FIG. 1. FIG. 7 is a diagram illustrating a second screen display example 620 of the user terminal of FIG. 1. Also, although the screen display of the user terminal is used for ease of understanding, such a screen display is to be generated by the image generation unit 16 and displayed on the screen of the user terminal under the instruction of the game management unit 14 and the matching processing unit 15 of the server device 10. Although the configuration or operation of the terminal will be described below, the following embodiment will be described on the assumption that an input operation by a touch panel is performed on the screen, but the operation may be a mouse operation.

In the first screen display example 610, a user-specific my page screen 301 being a basic screen of a social game, a return button 302 to be used when a game is ended, various menu buttons 303, another user's avatar 304, a comment field 305 corresponding to the avatar 304, and a hunt button 306 triggering to start a battle are displayed. Also, in the second screen display example 620, a quest selection screen 307, an avatar 308, and a quest select button 309 are displayed while being overlapped with the screen of the first screen display example 610.

If the user performs an input operation to the hunt button 306 when the first screen display example 610 is displayed, the screen is transitioned to the second screen display example 620 illustrated in FIG. 7, and the quest selection screen 307 appears. Herein, the hunt is a trigger for starting a battle game.

In a hunt mode, an avatar 308, a user name, a rank, a point to next rank, a remaining life point (LP), an LP gauge, and the like are displayed on the quest selection screen 307 as the information of the user who performs the input operation to the hunt button 306. Also, a plurality of quest select buttons 309 appears and the user selects one of them.

Also, the quest is different in an upper limit of the number of participants, a level of difficulty, a reward for acquisition, and the like. The user performs the input operation to select an appropriate quest, considering the user's own status, strength of a deck, and the like. Also, the level of difficulty, the reward for acquisition, and the like are displayed on the quest select button 309. In the quest, a team is organized by a plurality of users, and a team battle battling against an enemy character is performed.

The user terminal is triggered by the input operation of the quest select button 309 to communicate with the server device 10 and transmits a participation request to the reception unit 210.

Returning to FIG. 5, the matching distribution unit 211 allocates a team to each user making the participation request according to whether the input operation has been performed to the quest select button 309, uploads the information to the server memory 17, and outputs the information the matching information generation unit 212. Such an operation is continued until the upper limit of the number of participants of each quest.

The matching information generation unit 212 generates matching information for each user terminal so as to generate a matching room image to be transmitted to each user terminal, based on the output from the matching distribution unit 211 and the information of the server memory 17. Specifically, the following examples will be taken.

Matching Information (Information of User 1)
Information of User 3
Information of User 2

In the above, information of users making a request for participation in the same quest is described in order of participation request from above. Herein, when the user 3 performs the participation request for the second time, the information of the user 1 is included in the matching information before the user 3. Then, when the matching room image based on the matching information is generated, the avatar of the user 1 is previously included, which gives an impression that the user 3 will participate in the team as a guest later. Therefore, in the present embodiment, even when the users make the participation request in the above order, the matching information for generating the matching room screen to be transmitted to the terminal of the user 3 for the first time is generated as follows.

The matching information may include information of users participating in the quest, information indicating the participation order, and past quest results. The user information may include a user ID or a user name, a user ID matched in the past, and the like. The quest results may include accumulated points, the number of winning, the number of participations, level information, card information, and the like.

Matching Information (First)
Information of User 3

That is, the matching information to be transmitted to each user terminal for the first time includes only the user information of the user himself or herself, and excludes the user information of other users.

Also, the matching information for generating the matching room screen to be transmitted to the terminal of the user 3 for the second time is generated as follows, for example.

Matching Information (Second)
Information of User 3
Information of User 1

Also, the matching information for generating the matching room screen to be transmitted to the terminal of the user 3 for the third time is generated as follows, for example.

Matching Information (Third)
Information of User 3
Information of User 1
Information of User 2

The above is the matching information to be transmitted to the user 3, but the matching information to be transmitted to the user 2 is as follows.

Matching Information
Information of User 2
Information of User 1
Information of User 3

That is, regarding the order of the user information in the matching information, the user information of the terminal of the notification destination is ranked No. 1, and the user information is provided in descending order of the participation order among terminals other than the notification destination with respect to No. 2 and lower. That is, regarding the order of the user information in the matching information, if the user information of the terminal of the notification destination is ranked No. 1, the user information ranked No. 2 and lower may be random.

As describe above, in the present embodiment, the operation of the terminal is preferentially included in the user information, and user information is added one by one when next matching information is generated, regardless of the order of the participation request.

However, the present invention is not limited thereto, and only the user information of a difference from the previously transmitted matching information may be included. Also, the second or subsequent matching information may be generated in response to the reception of the search request at the reception unit 210, which will be described below. Also, only the matching information generated after the number of the applicants reaches the quota may be transmitted, without transmitting the matching information whenever the first to third matching information described above is generated. Even in such an aspect, it can be shown as if the user terminal of the notification destination made the earliest participation request.

Each user himself or herself who is to participate in the game can be recognized as No. 1 of the expression of the participation in the game, and therefore, the game can be easily heated so as to accelerate the contribution with the positive attitude with respect to the corresponding team.

By performing the generation of the matching information for each user terminal as described above, each user can feel as if the user himself or herself first entered the matching room. Therefore, independence arises to heat up the game, and the user can enjoy the heated game as a whole.

Also, by gradually adding other user information one by one instead of adding other user information at a time, the expectation of the game is gradually increased. Therefore, the user can feel a sense of excitation, and the enjoyment of the game can be improved.

Herein, when adding the ranking No. 2 or subsequent user information included in the matching information, a study on priority order can be conducted. Hereinafter, a brief description will be given. The server memory 17 of the server device 10 includes history information that can achieve a correlation between users. For example, the affinity is determined based on the correlation such as the number of times of organizing the team together, shortness of a count time from a date and time when the team was organized most recently, a degree of connection on the SNS, a species of character, attribute(s), level, and the like, and the user of higher affinity is preferentially added to the user information. In the case of conducting such a study, first, the user information of the user making a request for participation in a certain quest is polled. Among them, the matching between the users is performed according to the history information in which the correlation between the respective users can be achieved.

By preferentially adding the user information having the high affinity, to the user can feel as if close users are gathered in a hurry. Therefore, the sense of excitation can be enhanced, and the enjoyment of the game can be improved. Also, since the users having the high affinity are matched as the same team, it is highly likely that exchange will occur between users, and the exchange between user can be further activated.

Figure 8:
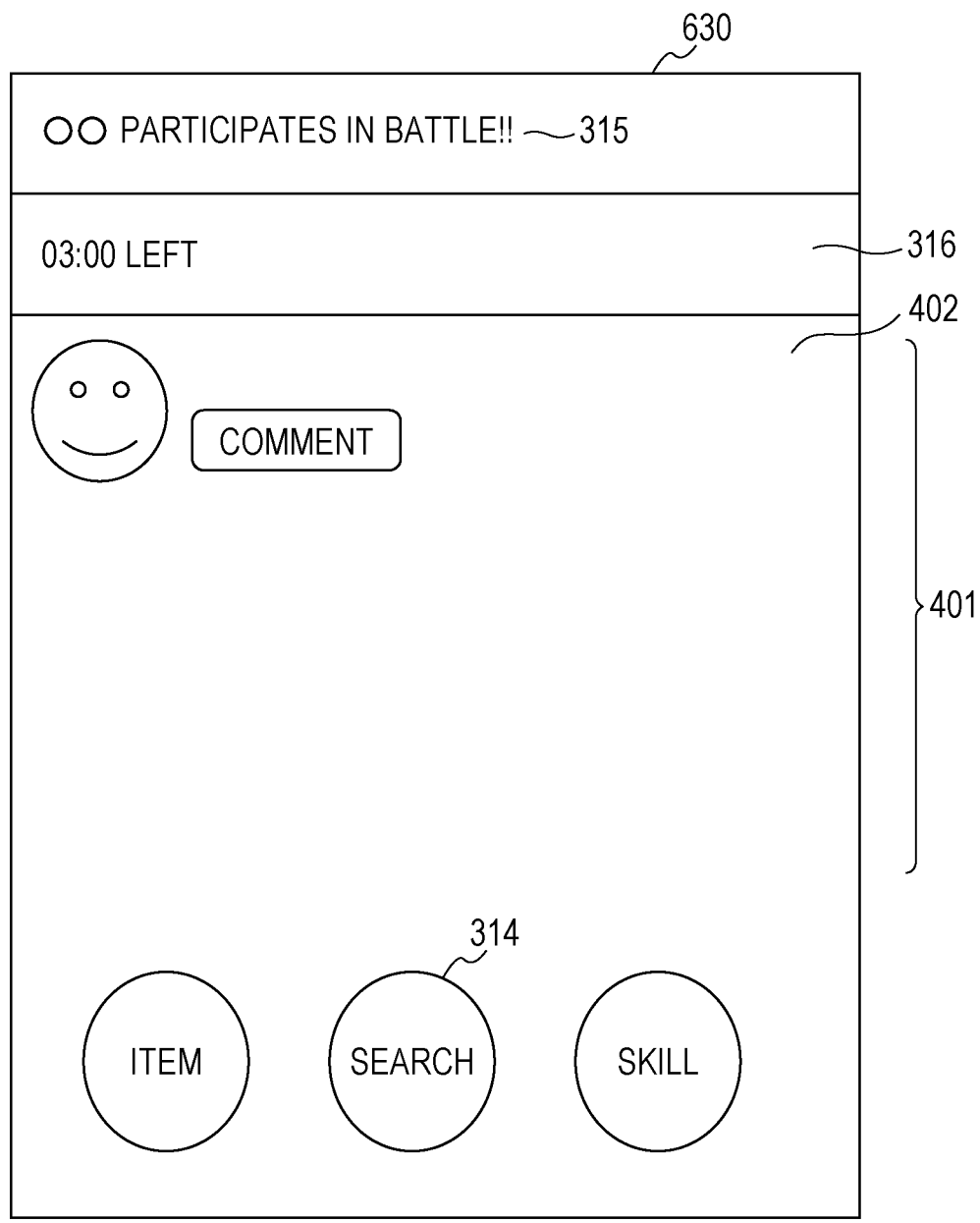
FIG. 8 is a diagram illustrating a third screen display example of the user terminal of FIG. 1.
Figure 9:
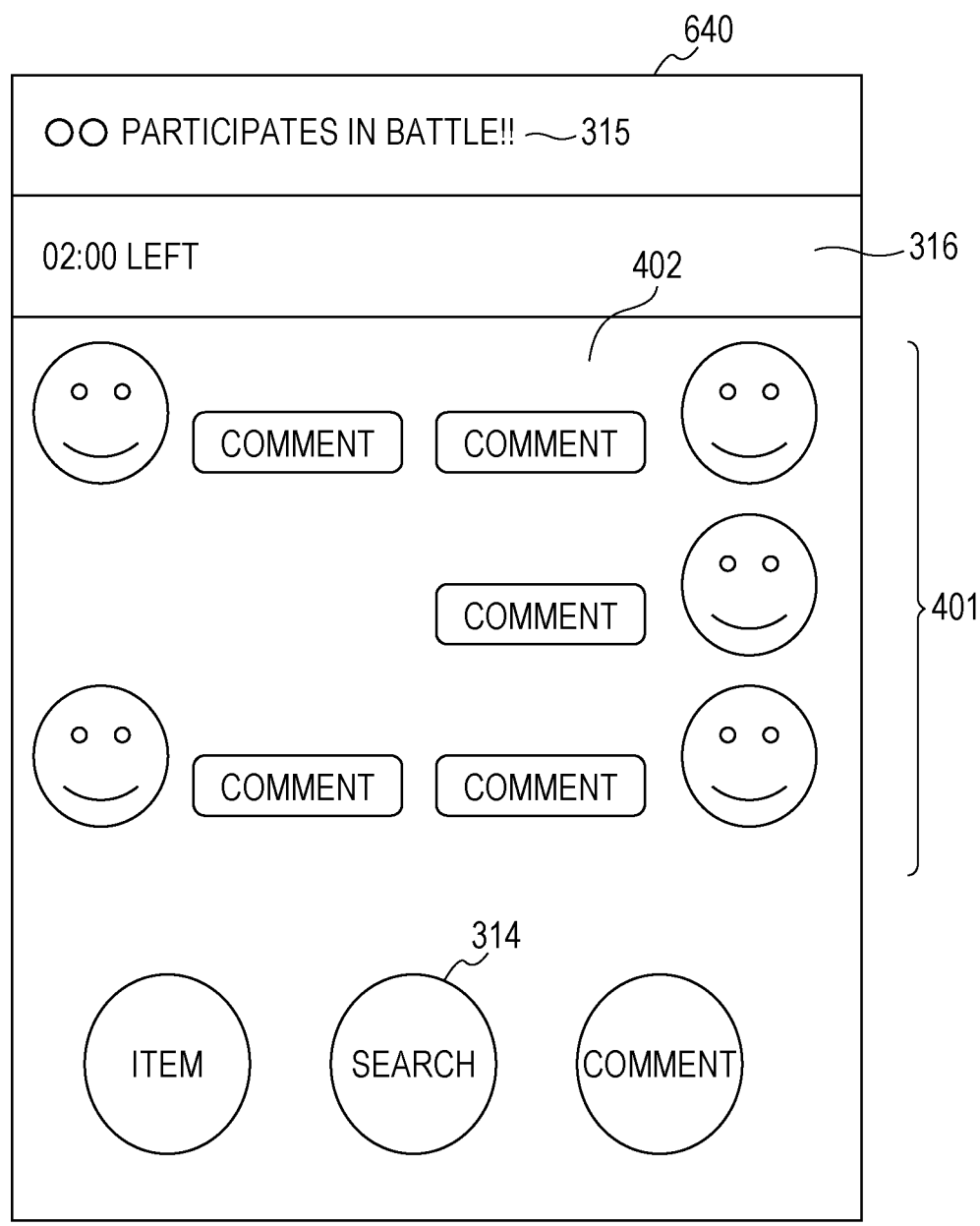
FIG. 9 is a diagram illustrating a fourth screen display example of the user terminal of FIG. 1.

Herein, the screen when the matching information generated by the matching information generation unit 212 is notified to the user terminal will be described with reference to FIGS. 8 and 9. FIG. 8 is a diagram illustrating a third screen display example 630 of the user terminal of FIG. 1. FIG. 9 is a diagram illustrating a fourth screen display example 640 of the user terminal of FIG. 1. In the third screen display example 630 and the fourth screen display example 640, a battle participation announcement field 315, a timer field 316, a user information display field 401, and a matching room image 402 are displayed.

In the display field 401 of the matching room image 402, avatar and comment are displayed together as the information of the users who made a request for participation in the team battle and are allocated to the same team. Herein, in the matching room image 402, the battle participation announcement field 315 displaying the user name, and the timer field 316 displaying a remaining time to a participation deadline are displayed based on the user information added most recently.

As illustrated in the fourth screen display example 640 of FIG. 9, the user information is sequentially displayed on the display field 401, and avatar images or comments are increased. That is, in the third screen display example 630 of "3 minutes left" displayed on the timer field 316, only the user information of the user himself or herself is displayed. In the fourth screen display example 640 of "2 minutes left", other user information is added. Regardless of the order of the user's participation request, this is displayed in such an order. Also, there are many cases where the user information of the user himself or herself browsing the matching room image 402 is unnecessary. In that case, the user information of the user himself or herself and the matching room screen 402 need not be actively displayed. It is obvious that the present embodiment also includes that.

Figure 10:
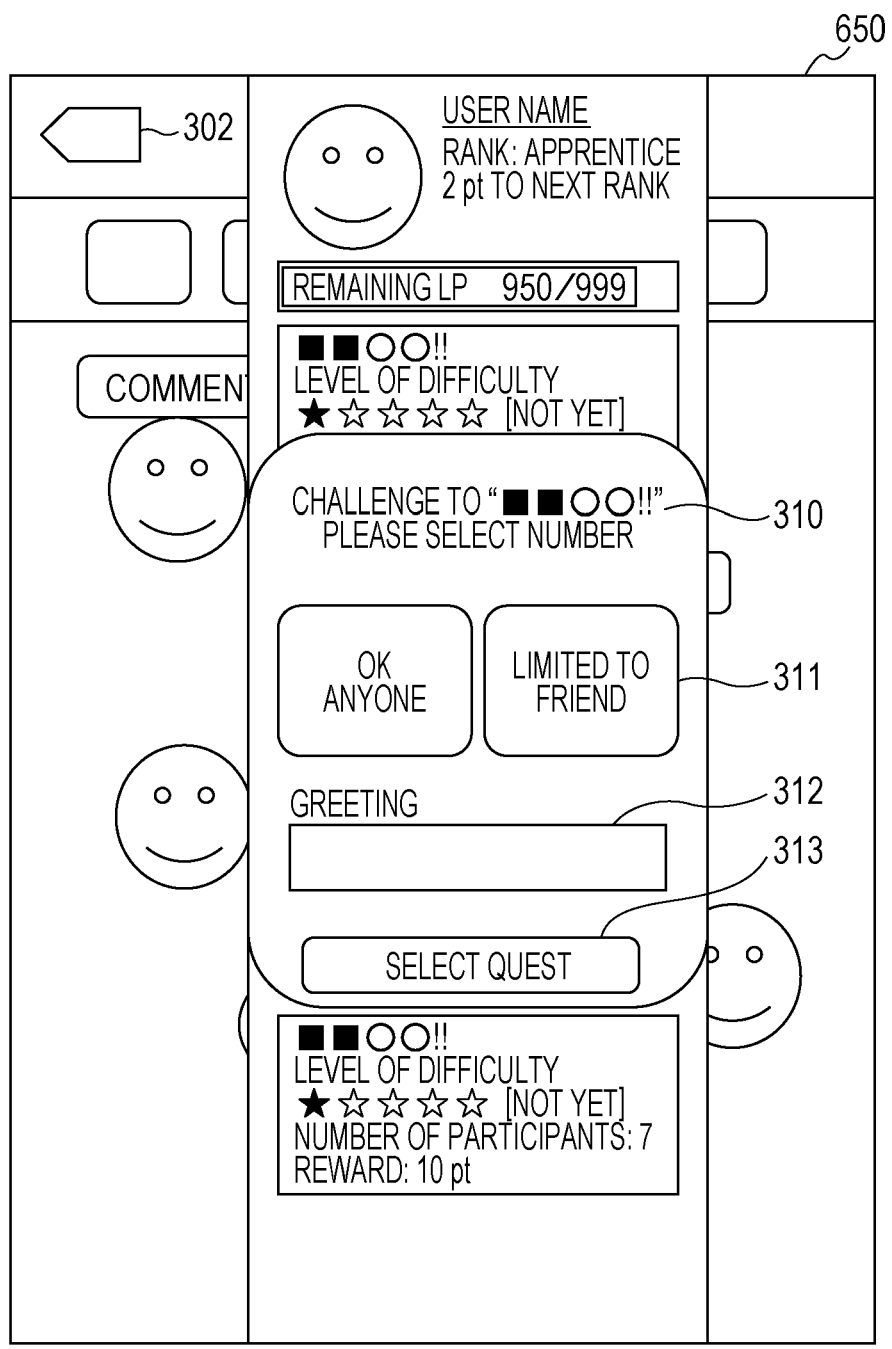
FIG. 10 is a diagram illustrating a fifth screen display example of the user terminal of FIG. 1.

Next, in the user terminal, processing after the input operation is performed on the quest select button 309 in the second screen display example 620 illustrated in FIG. 7 will be described with reference to FIG. 10. FIG. 10 is a diagram illustrating a fifth screen display example 650 of the user terminal of FIG. 1. In the fifth screen display example 650, a menu image 310, a member select button 311, an input field 312, and a reselect button 313 are displayed.

After the input operation is performed on the quest select button 309 of the second screen display example 620 illustrated in FIG. 7, the screen display is transitioned to the fifth screen display example 650. A member selection and comment input menu image 310 is displayed, and a member select button 311 limiting members organizing a team is displayed on the menu image 310.

In the fifth screen display example 650, two buttons are displayed as the member select button 311, and one mode of "limited to friend" in the SNS and "OK anyone" can be selected. Also, there is the input field 312 where greeting can be input, and it is possible to deepen the friendship with other uses by inputting greeting comments. Also, the reselect button 313 for performing quest reselection processing is displayed. When the input operation is performed on the reselect button 313, the operation of returning to the quest selection screen 307 illustrated in FIG. 7 is performed.

Herein, when the "OK anyone" mode is selected in the member select button 311, users having selected the same quest select button 309 within a given time are allocated to the same team. However, when the team-battle participation requesters reaches the maximum team quota of the quest, the team allocation is ended, and the team battle game is progressed. Also, when it has come to the participation deadline without reaching the upper limit of the participation in the team battle, the game is progressed by replenishing a so-called Non Player Character (NPC), instead of a general user. In a state where a position is vacated, the fighting strength of the team may be lowered to disrupt the progress of the game, or the enjoyment of the user may be inhibited.

Then, in the user terminal, when the input operation is performed on the member select button 311 and the comment is input to the input field 312, the matching room image 402 illustrated in the third screen display example 630 of FIG. 8 or the fourth screen display example 640 of FIG. 9 is displayed on each user terminal participating the corresponding team battle, or the comment is displayed on a comment scroll field 317 in FIG. 11 to be described below in a form corresponding to the avatar image corresponding to the user terminal inputting a comment.

A plurality of buttons for the team battle, such as the search button 314, is displayed on the matching room image 402, and the input operation is possible thereon. By performing the input operation on the search button 314 in the matching room, the user finally finds enemies, and enters the battle game by the organized team.

Figure 11:
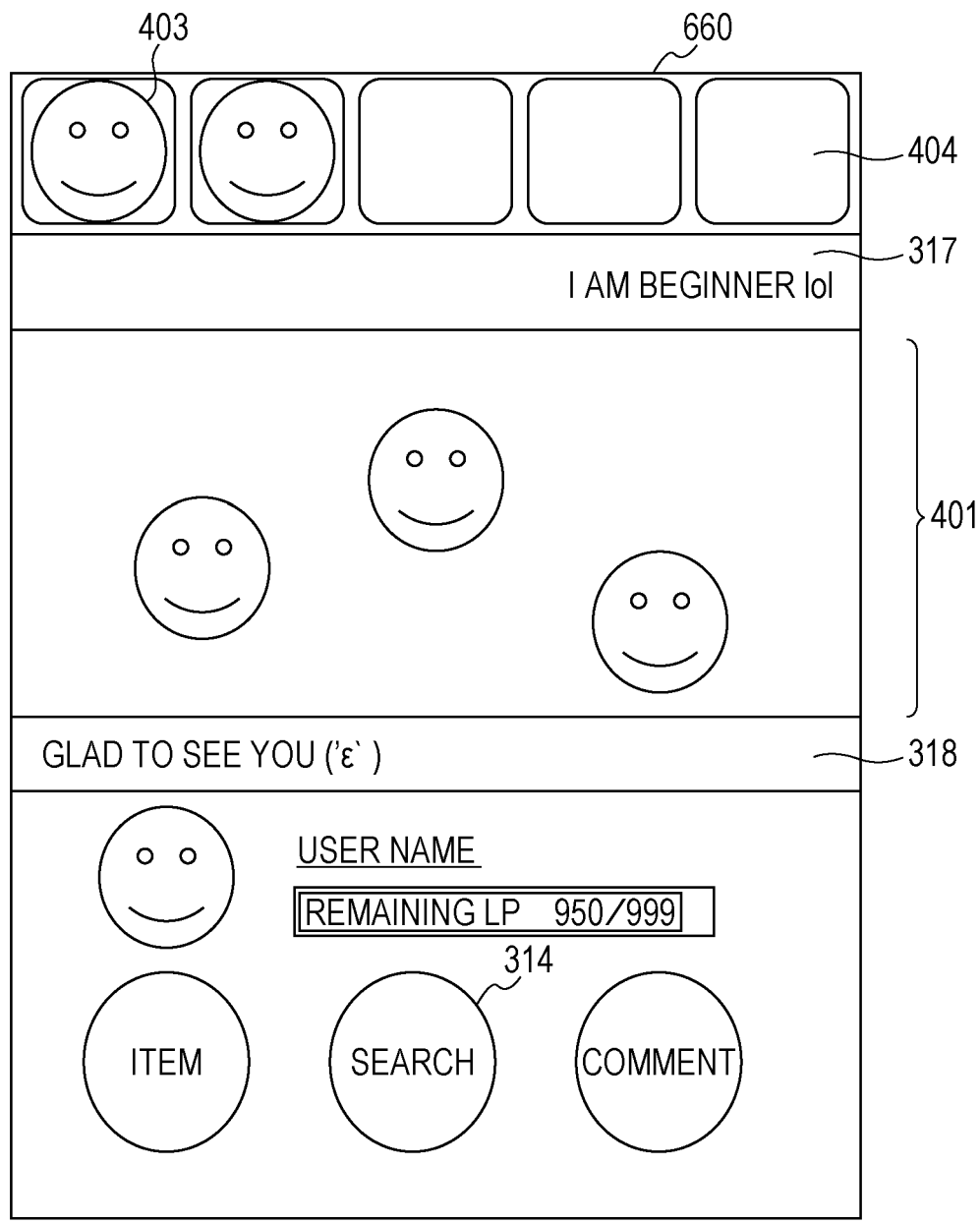
FIG. 11 is a diagram illustrating a sixth screen display example of the user terminal of FIG. 1.

Also, the second screen display example 620 and the third screen display example 630 illustrated in FIGS. 8 and 9 are different from the third screen display example 410 illustrated in FIG. 11. All the matching room images 402 are displayed, but the information of the user making the request for participation in the team battle is arranged, for example, in a combination of the avatar or the comment in the second screen display example 620 and the third screen display example 630.

FIG. 11 is a diagram illustrating a sixth screen display example 660 of the user terminal. In the sixth screen display example 660, comment scroll fields 317 and 318, an avatar 403, and a team member display field 404 are displayed.

Specifically, for example, the information of the user making the request for participation in the team battle is sequentially displayed in the team member display field 404 as the avatar 403, and the comments are displayed in the comment scroll fields 317 and 318 and are automatically scrolled. When the comments are displayed, the avatars corresponding to the user terminals inputting the corresponding comments may be processed to flash on and off. By the above, the comment overlaid on the matching room image 402 flows to thereby enhance the performance effect.

During the waiting time before the start of the team battle, the user may be kept from being bored by enjoying communicating with other users through chatting using the comment in the matching room.

Herein, specifically, actions performed by the user while waiting in the matching room will be described. The user can play, for example, a mission game that searches fields by performing an input operation on the search button 314. This is because the user is kept from being bored by performing entertainment using the time until the start of the team battle. In such a mission game, the user can acquire various game contents such as an experience point, an in-game currency, a card, or an item. Whenever the user performs the input operation on the search button 314, other users gradually come to join the team.

Also, such an entertainment is not limited to the mission game, and may be a quiz game or a shooting game. Also, when playing the mission game, the displaying may be output such that previously teach information of enemies to battle from now, like "during analysis" or "data of analysis result . . . weakness . . . " By performing such processing, the waiting time is more meaningful in the matching room screen, and the user's interest in the game can be enhanced.

Figure 12:
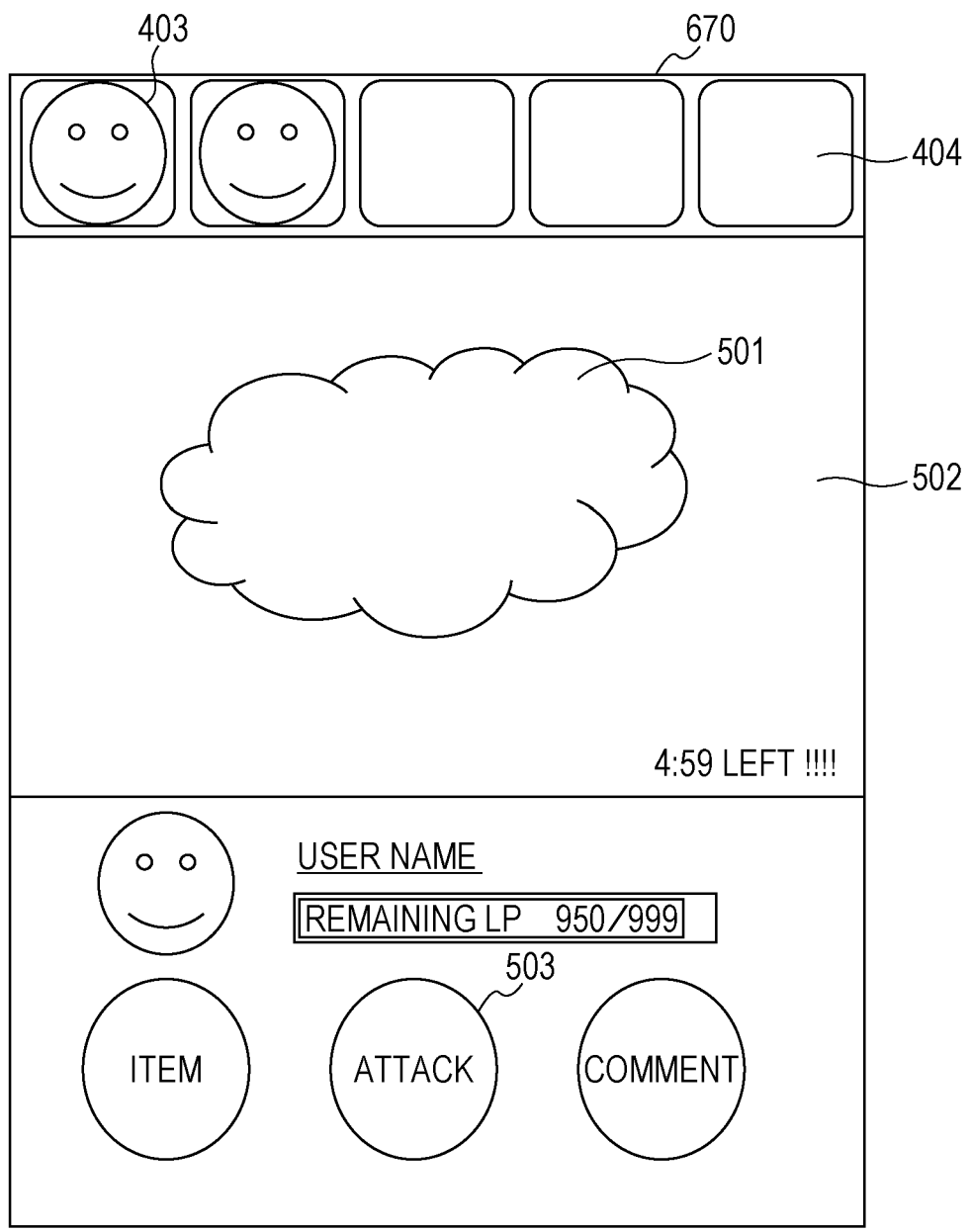
FIG. 12 is a diagram illustrating a seventh screen display example of the user terminal of FIG. 1.

Next, the case of entering the team battle mode will be described with reference to FIG. 12. FIG. 12 is a diagram illustrating a seventh screen display example 670 of the user terminal of FIG. 1. The seventh screen display example 670 is an example in which an enemy 501, a battle image 502, and an attack button 503 are displayed.

In the team battle mode, the enemy 501 is displayed in the field of the battle image 502. In the seventh screen display example 670, unlike the matching room screen, the search button 314 is not present, and the attack button 503 for starting the attack against the enemy is displayed instead. Each user progresses the battle by making an attack against the enemy through the input operation on the attack button 503, or the like.

Figure 13:
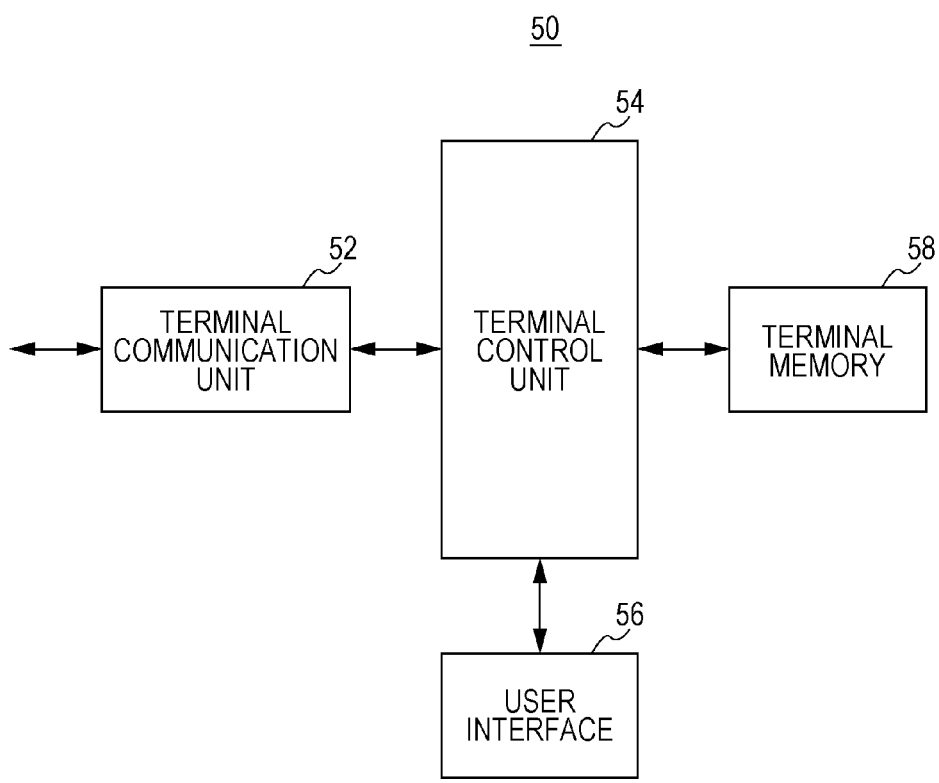
FIG. 13 is a diagram illustrating an example of a configuration of a mobile terminal or a PC terminal of FIG. 1.

Next, the configuration of the user terminal will be described with reference to FIG. 13. FIG. 13 is a diagram illustrating an example of a configuration of the mobile terminal 50 or the PC terminal 70 of FIG. 1. Herein, for convenience of description, the configuration of the mobile terminal 50 will be described, but the PC terminal 70 has the same configuration.

The mobile terminal 50 includes a terminal communication unit 52, a terminal control unit 54, a user interface 56, and a terminal memory 58. The terminal communication unit 52 receives an application downloaded from the server device 10, or a variety of information transmitted from the server device 10.

The terminal control unit 54 receives the instruction from the user through the user interface 56, controls the installation of the application, or controls the API control of the social game, while accessing the terminal memory 58.

Also, the user interface 56 includes a screen interface for displaying a message to the user, various screens such as the social game matching room screen, or the like, an input interface for receiving an input of a keyboard or a touch panel from the user, and an image capturing unit such as a camera.

The user interface 56 receives the selection of the quest from the user, that is, the request for participation in the team battle, or the input of various comments, the operation of the action button, and the like, and transmits them to the terminal control unit 54.

The terminal memory 58 is used to store a corresponding application when an android game is downloaded from an application provision platform. Also, even in the browser game, the terminal memory 58 is used as a cache memory, or is used to temporarily store image data.

Hereinafter, as an example of an operation when the user A makes a request for participation in a team battle, an overall operation of the user terminal on the assumption of the browser game will be described below.

When the user A starts a web browser and selects a social game site, the terminal control unit 54 uses the terminal communication unit 52 to receive data of the social game in a way of running on the web browser communicating with the server device 10.

In the user interface 56, a guidance to perform a procedure of login to the social game may be displayed, but, for simplicity of description, it will be omitted for simplicity. The social game will be described as started.

In the user interface 56, the first screen display example 610 illustrated in FIG. 6 is displayed, and the user A performs an input operation on the hunt button 306. The terminal control unit 54 performs communication with the server device 10 by using the terminal communication unit 52, downloads the quest selection screen 307 illustrated in FIG. 7, stores the quest selection screen 307 in the terminal memory 58, and displays the quest selection screen 307 on the user interface 56.

Then, the user A performs an input operation on the quest select button 309. The terminal control unit 54 performs communication with the server device 10 by using the terminal communication unit 52, transmits the quest select button 309, that is, the request for participation in the team battle, to the server device 10, downloads the menu screen 310 illustrated in FIG. 10 from the server device 10, stores the menu screen 310 in the terminal memory 58, and displays the menu screen 310 on the user interface 56.

Then, the user A performs a comment input operation on the comment input field 312, and performs an input operation on the member select button 311. The terminal control unit 54 performs communication with the server device 10 by using the terminal communication unit 52, transmits the input comment information and the member selection information to the server device 10, downloads the matching room image 402 illustrated in FIG. 8 from the server device 10, stores the matching room image 402 in the terminal memory 58, and displays the matching room image 402 on the user interface 56.

Herein, when the matching room image 402 is generated in the server device 10, even in a case where there are other users selecting the same quest in the step of receiving the request for participation in the team battle from the terminal of the user A, the information of other users is transmitted to the user terminal, without being included in the matching room image 402.

Then, the matching room image 402 is displayed, and the user A performs an input operation on the search button 314. The terminal control unit 54 performs communication with the server device 10 by using the terminal communication unit 52, downloads from the server device 10 the image or the like relevant to the mission game corresponding to the search button 314, stores the image in the terminal memory 58, and displays the image relevant to the mission game on the user interface 56.

Then, when there is information of other users making a request for participation in the same quest with respect to the server device 10 in a state where the matching room image 402 is displayed, the server device 10 may transmit information to the user terminal while including the information of other users in the matching room image 402 as illustrated in FIG. 9 when generating the matching room image 402.

Then, the terminal control unit 54 performs communication with the server device 10 by using the terminal communication unit 52, downloads the matching room image 402 illustrated in FIG. 9 from the server device 10, stores the matching room image 402 in the terminal memory 58, and displays the matching room image 402 on the user interface 56.

Then, when the reception period of the request for participation in the team battle has elapsed, the server device 10 transmits the battle image 502, including the information of the enemy 501 or users participating in the team battle, to the user terminal.

Then, the terminal control unit 54 performs communication with the server device 10 by using the terminal communication unit 52, downloads the enemy 501 illustrated in FIG. 12 from the server device 10, stores the enemy 501 in the terminal memory 58, and displays the enemy 501 on the user interface 56.

Then, while the user A performs an input operation on the attack button 503, the information to the effect of the attack is transmitted to the server device 10, and the battle processing proceeds to the server device 10. Thereafter, the operation is repeated until the battle is ended, based on the operation of the user A, and the server device 10 transmits the battle image 502, including the image of the enemy 501 or the hit point (HP) consumption of the enemy, to the user terminal.

Figure 14:
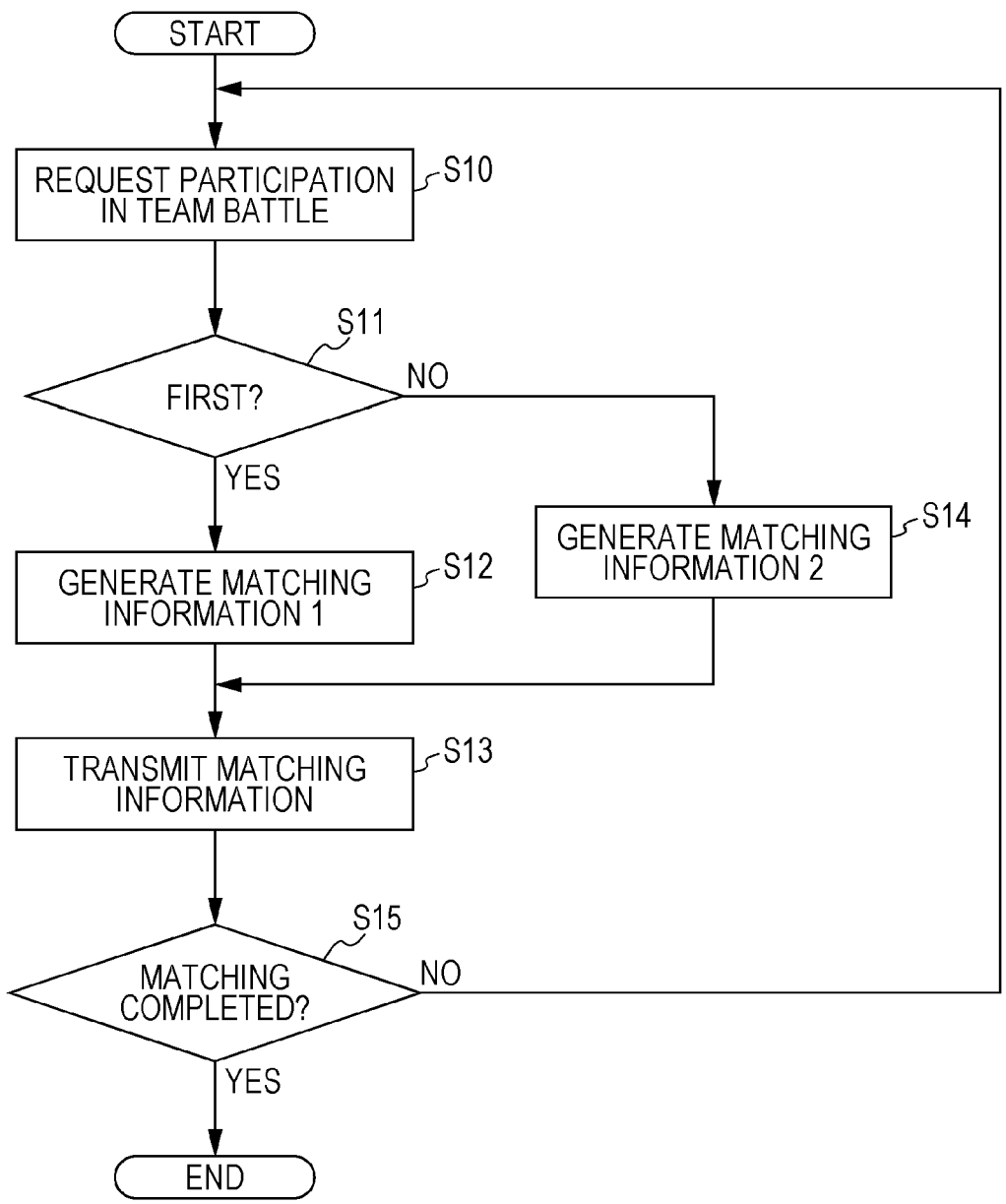
FIG. 14 is a flowchart illustrating a processing procedure of the matching processing unit of FIG. 2.

FIG. 14 is a flowchart illustrating a processing procedure of the matching processing unit 15 of FIG. 2. This flowchart may be started in response to the operation to the effect that the present social game is started from the user terminal.

First, the matching processing unit 15 receives a request of a user A or other user for participation in a team battle from a user terminal through the server communication unit 12

(S10). As described above, the participation request is performed by the operation of the quest select button 309. When there is the participation request, the user information and the terminal information are stored together in the server memory 17.

Herein, whether the matching information or the matching room image in the quest is first transmitted to the user A receiving the participation request is determined by the record of the server memory 17. When it is determined as first (Yes of S11), the matching information is generated without including the information of other users (S12). On the other hand, when it is determined as not first (No of S11), the matching information is generated by including the information of, for example, the user making the first participation request among other users making the request for participation in the team battle (S14). In this case, by using history information capable of achieving the correlation between the respective users, a user having high affinity with the user A may be extracted among other users making the request for participation in the team battle, and matching information including the information of the user may be generated.

Then, the generated matching information is transmitted to the user terminal of the user A (S13). Herein, as described above, the matching room image can be generated based on the matching information and be transmitted to the user terminal.

Finally, the matching processing unit 15 determines whether it is in a state where the matching should be ended, such as whether the matching time is ended, or whether the participants of the team battle reaches the upper limit. When determined to be ended (Yes of S15), the matching processing unit 15 ends the processing, and when determined not to be ended (No of S15), the matching processing unit 15 repetitively processes the flow until the end condition.

Figure 15:
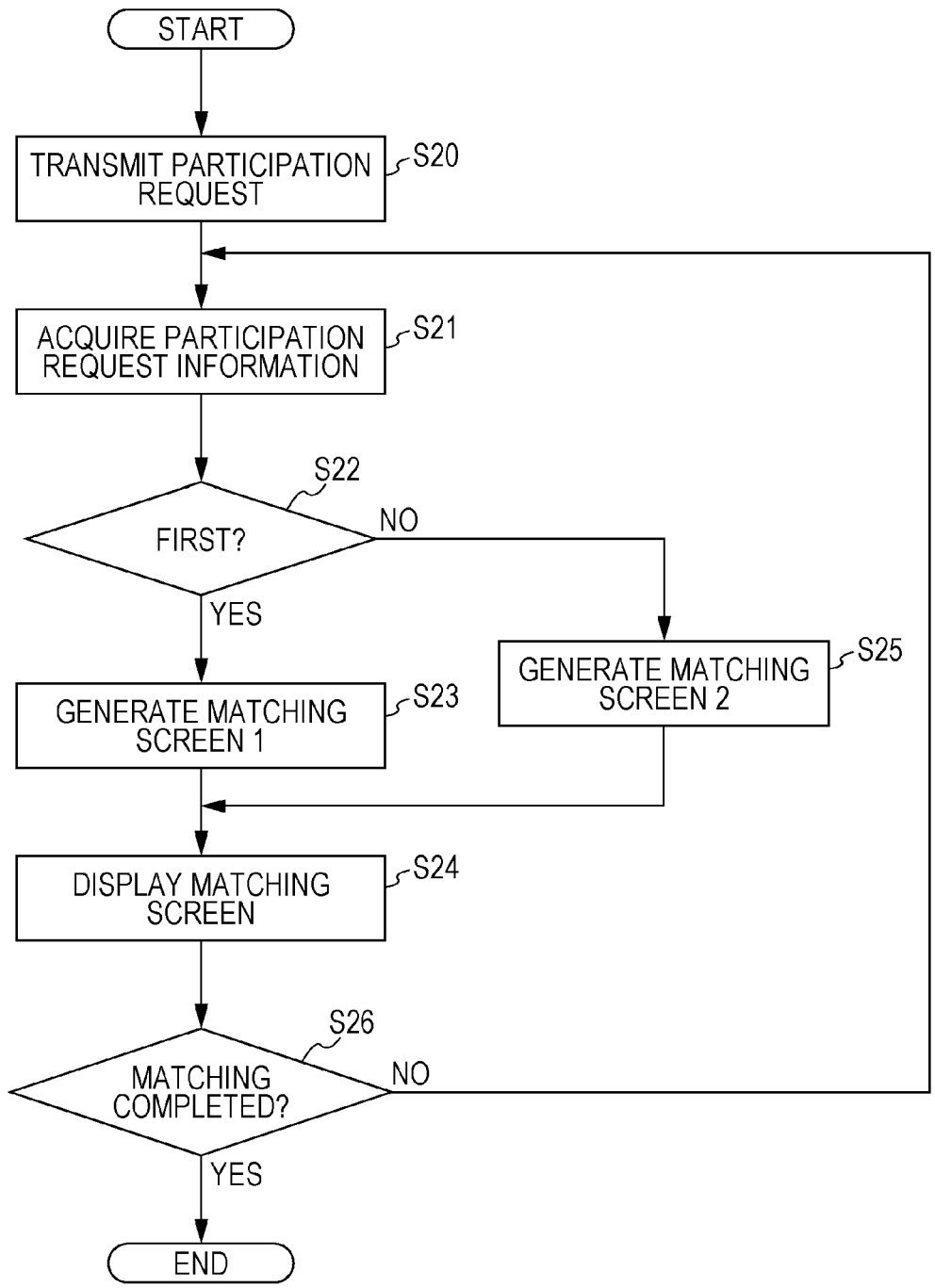
FIG. 15 is a flowchart illustrating a processing procedure of a terminal control unit of FIG. 13.

FIG. 15 is a flowchart illustrating a processing procedure of the terminal control unit 54 of FIG. 13. When applying to the application game that installs the game application program on the user terminal, this flowchart is started in response to the operation to the effect that the present social game is started from the user terminal.

First, the terminal control unit 54 transmits participation request information to the server device 10 through the terminal communication unit 52 that receives the operation of the request of the user A for the participation in the team battle from the user interface 56 (S20). As described above, the participation request is performed by the operation of the quest select button 309.

Then, the terminal control unit 54 acquires information of all users making a request for participation in the same quest at that time from the server device 10 through the terminal communication unit 52 (S21). In the above, the processing of the matching information is performed in the server device 10. However, in the case of the application, since that processing can be performed on the terminal side, there is no problem even if the information of all users is acquired. It is one modification of the present embodiment.

Herein, the terminal control unit 54 determines whether the matching information or the matching room image in the quest is first generated to the user A receiving the participation request. When it is determined as first (Yes of S22), the matching room image is generated based on the generation of the matching information without including the information of other users (S23). On the other hand, when it is determined as not first (No of S22), the matching information is generated by including the information of, for example, the user making the first participation request among other users making the request for participation in the team battle (S25). In this case, by using history information capable of achieving the correlation between the respective users, a user having high affinity with the user A may be extracted among other users making the request for participation in the team battle, matching information including the information of the user may be generated, and a matching room image may be generated based on the matching information. A parameter to determine the affinity may use a parameter held on the terminal side, and any method of acquiring the parameter by performing communication with the server device 10 may be used.

Then, the terminal control unit 54 displays the generated matching room image on the user interface 56 (S24).

Finally, the terminal control unit 54 determines whether it is in a state where the matching should be ended, such as whether the matching time is ended, or whether the participants of the team battle reaches the upper limit. When determined to be ended (Yes of S26), the terminal control unit 54 ends the processing, and when determined not to be ended (No of S27), the terminal control unit 54 repetitively processes the flow until the end condition. Also, the acquisition of the parameter determining whether it is in a state where the matching should be ended may be appropriately performed in the acquisition of participation request information (S21).

As described above, the respective embodiments have been described. However, when performing the matching processing, in the matching information indicating the matching state of the team or the matching image (matching room image) displayed on the terminal side, each user himself or herself feels that he or she first participated in the team. Thus, the independence of the user to the social game is significantly improved, and each user actively participates in the social game, thereby obtaining the effect of heating up the game as a whole and making the game amusing.

The present invention has been described with reference to the embodiments. The present invention is not limited to the above-described embodiments and the contents of the respective embodiments, and various modifications can be made without departing from the scope of the present invention. The embodiments are merely exemplary, and it is apparent to those skilled in the art that various modifications can be made in a combination of each element or each processing process, and such modifications also fall within the scope of the present invention.

What is claimed is:

1. A system comprising:
   a server device configured to provide a network game allowing one or more users to participate in through a communication line;
   a plurality of user terminals, each of the plurality of user terminals configured to allow a user to execute the network game provided by the server device,
   wherein the server device includes:
   a reception unit configured to receive a request for participation in a predetermined network game from each of the plurality of user terminals used by a plurality of users; and
   a matching processing unit configured to integrate user information for each of the plurality of user terminals from which the reception unit receives the participation request to generate matching information of each user participating in the same network game to be started at the same time, and notify the generated matching information to each user terminal from which the reception unit receives the participation request, and
   each of the plurality of user terminals includes a terminal control unit displaying first matching information including only user information of the each of the plurality of user terminals by using the matching information notified by the matching processing unit for the each of the plurality of user terminals associated with the participation request that was not received first by the reception unit, and then subsequently displaying second matching information including at least user information of at least another one of the plurality of user terminals, as if the participation request for the each of the plurality of user terminals was received first by the reception unit.

2. The system according to claim 1,
wherein the terminal control unit displays the second matching information including at least user information of the user who first makes the request for participation in the network game.

3. The system according to claim 1,
wherein by using history information related to affinity between the respective users, the terminal control unit extracts a user having high affinity with the user of the corresponding user terminal among other users making the request for participation in the network game, and displays matching information including the information of the extracted user.

4. The system according to claim 3,
wherein the terminal control unit extracts a user having high affinity by using the history information stored in at least one of the user terminal or the server device, and displays matching information.

5. A non-transitory computer-readable storage medium storing game program, which causes a computer to execute a network game allowing one or more users to participate in through a communication line, comprising:

receiving a request for participation in a predetermined network game from each of a plurality of user terminals used by a plurality of users;

integrating user information for each of the plurality of user terminals whose participation request is received, and generating matching information for each user participating in the same network game to be started at the same time;

notifying the generated matching information to each of the plurality of user terminals whose participation request is received, and displaying first matching information including only user information of the each of the plurality of user terminals by using the notified matching information for ones of the each of the plurality of user terminals associated with the participation request that was not processed first, and then subsequently displaying second matching information including at least user information corresponding to other ones of the each of the plurality of the user terminals as if the participation request for the ones of the plurality of user terminals was processed first.

\* \* \* \* \*